(12) United States Patent
Heuer et al.

(10) Patent No.: US 8,539,784 B2
(45) Date of Patent: Sep. 24, 2013

(54) ADJUSTABLE ORIFICE FOR USE IN AN AIR CONDITIONING SYSTEM, IN PARTICULAR AN AIRCRAFT AIR CONDITIONING SYSTEM

(75) Inventors: Gunnar Heuer, Horneburg (DE); Birgit Meiser, Wismar (DE)

(73) Assignee: Airbus Deutschland GmbH, Hamburg (DE)

( * ) Notice: Subject to any disclaimer, the term of this patent is extended or adjusted under 35 U.S.C. 154(b) by 1177 days.

(21) Appl. No.: 12/435,519

(22) Filed: May 5, 2009

(65) Prior Publication Data

US 2009/0277204 A1 Nov. 12, 2009

Related U.S. Application Data

(60) Provisional application No. 61/051,121, filed on May 7, 2008.

(30) Foreign Application Priority Data

May 7, 2008 (DE) .......................... 10 2008 022 473

(51) Int. Cl.
*F25D 17/04* (2006.01)
(52) U.S. Cl.
USPC .............. 62/186; 62/239; 62/DIG. 5; 454/71; 454/73; 454/297; 454/317
(58) Field of Classification Search
USPC ........ 62/186, 239, 404, 408, DIG. 5; 454/71, 454/73, 297, 308, 317, 322–23, 334
See application file for complete search history.

(56) References Cited

U.S. PATENT DOCUMENTS

| 6,050,892 A * | 4/2000 | Sodec ........................... 454/289 |
| 6,361,432 B1 * | 3/2002 | Walker .......................... 454/290 |
| 7,841,930 B2 * | 11/2010 | Rimmer et al. ............... 454/290 |
| 2002/0155806 A1 * | 10/2002 | McGill .......................... 454/298 |
| 2008/0156385 A1 | 7/2008 | Treimer et al. |

FOREIGN PATENT DOCUMENTS

| DE | 592537 | 2/1934 |
| DE | 1832187 | 5/1961 |
| DE | 2219380 | 11/1973 |
| DE | 19932826 | 1/2001 |
| DE | 102007001052 | 7/2008 |

* cited by examiner

*Primary Examiner* — Marc Norman
*Assistant Examiner* — Jonathan Bradford
(74) *Attorney, Agent, or Firm* — Wood, Herron & Evans, LLP

(57) ABSTRACT

An adjustable orifice for use in an aircraft air conditioning system includes a first orifice element which has an orifice frame as well as a first orifice area. When the orifice is assembled at a duct, the first orifice area of the first orifice element leaves open a part of a cross section of the duct. The orifice also includes a second orifice element with a second orifice area. When the orifice is assembled at the duct, the second orifice area of the second orifice element leaves open a part of the cross section of the duct. The second orifice element is rotatable about an axis, so that the second orifice area is rotatable relative to the first orifice area in order to set a desired flow cross section in the duct.

20 Claims, 6 Drawing Sheets

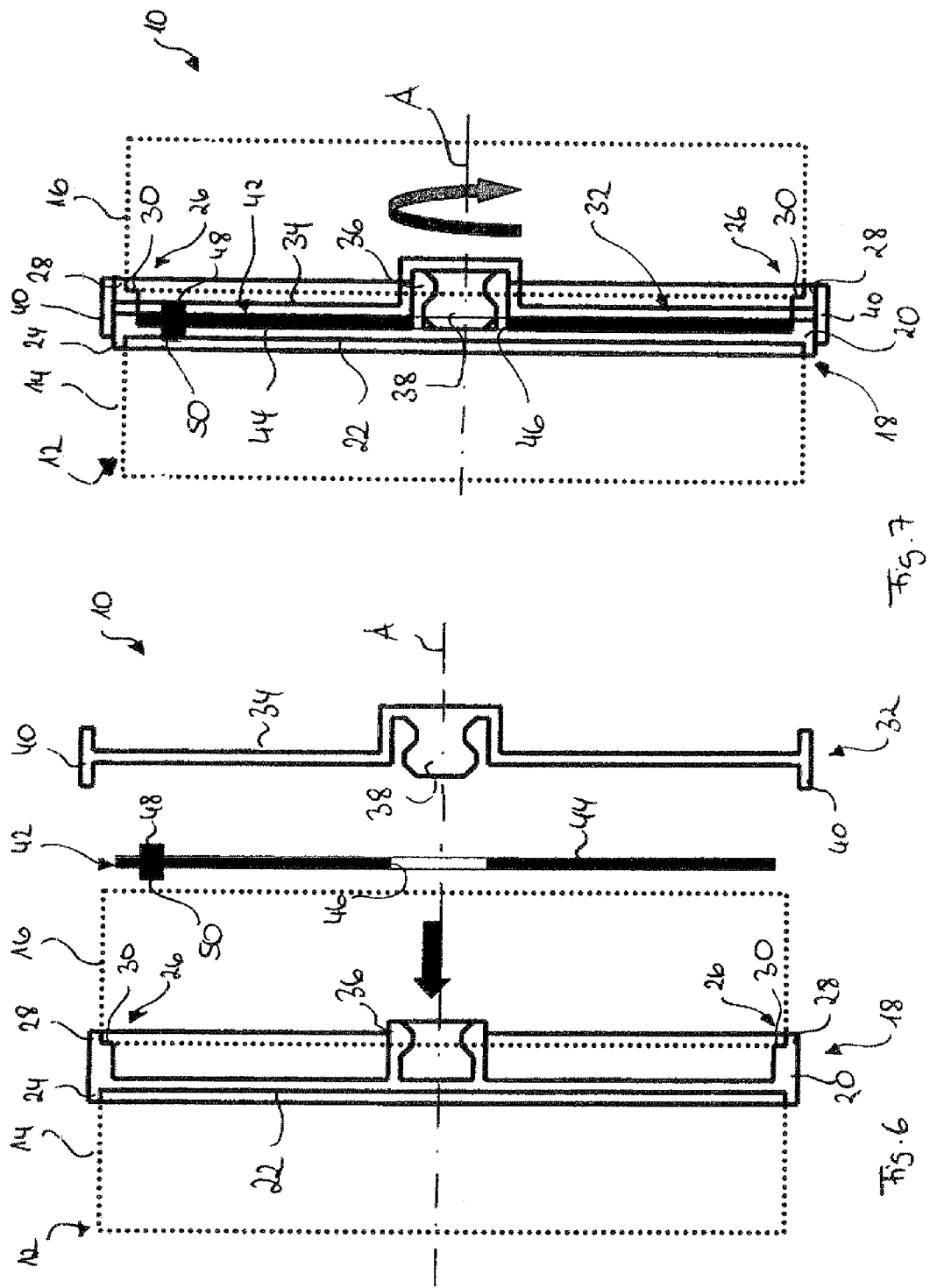

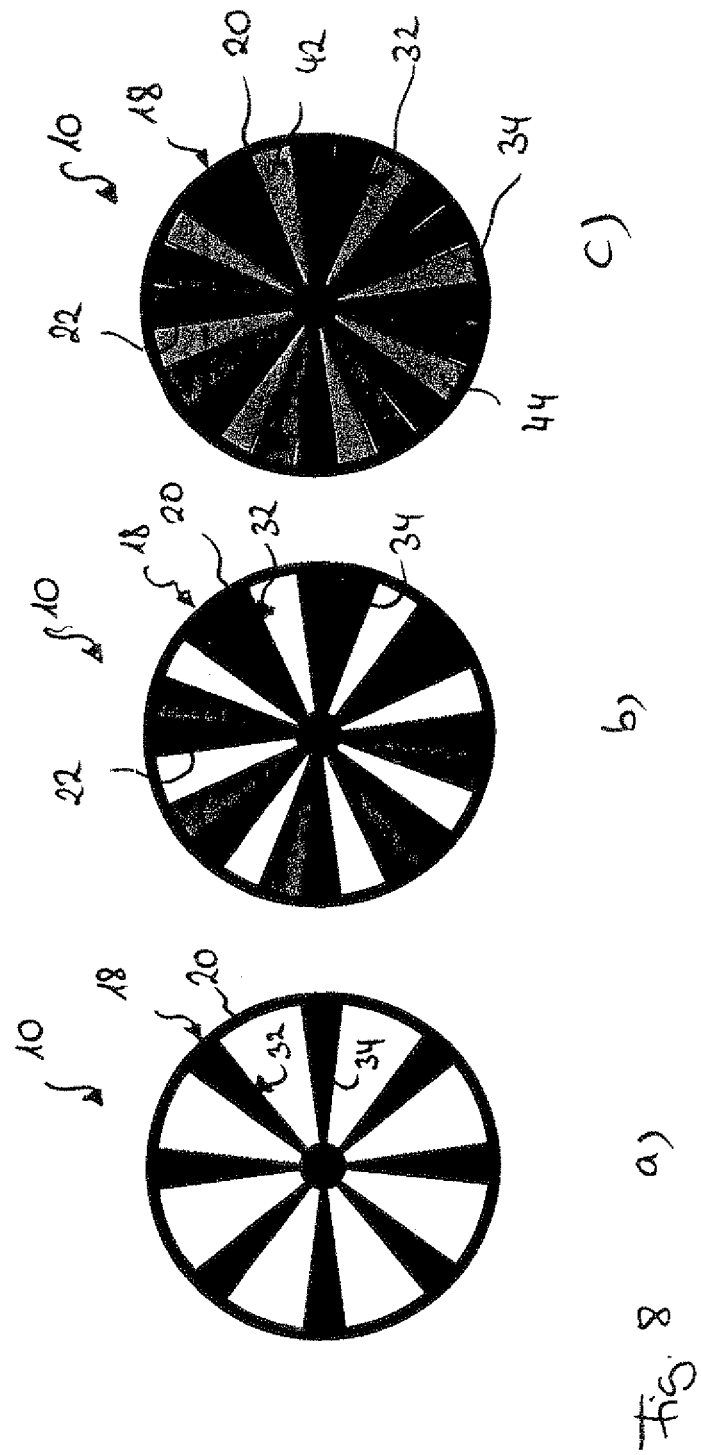

ADJUSTABLE ORIFICE FOR USE IN AN AIR CONDITIONING SYSTEM, IN PARTICULAR AN AIRCRAFT AIR CONDITIONING SYSTEM

This application claims priority to U.S. Provisional Patent Application No. 61/051,121, filed on May 7, 2008; and/or German Patent Application No. 10 2008 022 473.1 filed on May 7, 2008.

TECHNICAL FIELD

The present invention relates to an adjustable orifice for use in an air conditioning system, in particular an aircraft air conditioning system, as well as an aircraft air conditioning system equipped with an adjustable orifice of this kind.

BACKGROUND

Air conditioning systems which are currently used in aircraft, in particular in passenger aircraft, comprise a plurality of ducts, such as, e.g. recirculation ducts, fresh air ducts, exhaust air ducts etc. The volumetric flow through these ducts as well as the pressure in these ducts are regulated by orifices, which are introduced into the ducts in order to set a desired flow cross section. Orifices which have a fixed flow cross section are at present used in aircraft air conditioning systems. Therefore, in order to enable different volumetric flows and/or pressures to be set in the ducts of an aircraft air conditioning system, different orifices, i.e. orifices which have different flow cross sections, must be used. As several hundred orifices are integrated into the air conditioning system of a modern passenger aircraft, the necessity of having to use different orifice types to set the desired flow and pressure conditions in the ducts of the aircraft air conditioning system leads to a high manufacturing and assembly expenditure and therefore to high costs.

The present invention is directed to the object of providing an orifice which is suitable for use in an air conditioning system, in particular an aircraft air conditioning system, and which enables the number of different orifice types used in the aircraft air conditioning system to be reduced. The present invention is also directed to the object of providing an aircraft air conditioning system equipped with an orifice of this kind.

This object is achieved by an orifice having the features mentioned below as well as by an aircraft air conditioning system having the features mentioned below.

SUMMARY

The adjustable orifice according to the invention which is intended for use in an air conditioning system, in particular an aircraft air conditioning system, comprises a first orifice element which has an orifice frame as well as a first orifice area. The orifice frame of the first orifice element serves to fasten the first orifice element to a duct of the aircraft air conditioning system, the shape of the orifice frame preferably being adapted to the cross section of the duct. If the duct has a circular cross section, the orifice frame therefore also preferably has a circular cross section. The orifice frame is in a similar manner preferably provided with an oval/elliptical or rectangular cross section if the duct has an oval/elliptical or rectangular cross section.

The first orifice area of the first orifice element is intended to be introduced into the cross section of the duct and is of a nature such that when the orifice is assembled at the duct it leaves open a part of the cross section of the duct. In other words, when the first orifice area of the first orifice element is introduced into the cross section of the duct, the first orifice area of the first orifice element leaves open a part of the duct cross section for through-flow. The duct can, for example, be a recirculation duct, a fresh air duct, an exhaust air duct or any other desired duct of the aircraft air conditioning system.

The orifice according to the invention in addition comprises a second orifice element which has a second orifice area. Similarly to the first orifice area of the first orifice element, the second orifice area of the second orifice element is intended to be introduced into the cross section of the duct and is likewise shaped so that when the orifice is assembled at the duct it leaves open a part of the cross section of the duct. In other words, when the second orifice area of the second orifice element is introduced into the cross section of the duct, it leaves open a part of the cross section of the duct for through-flow.

The second orifice element of the adjustable orifice according to the invention is connected to the first orifice element so as to be rotatable about an axis, so that the second orifice area of the second orifice element is rotatable relative to the first orifice area of the first orifice element in order to set a desired flow cross section in the duct. A maximum flow cross section in the duct is therefore left open when the second orifice area of the second orifice element is brought into congruence with the first orifice area of the first orifice element by appropriately rotating the second orifice element relative to the first orifice element. On the other hand, a reduction of the flow cross section in the duct can be achieved by rotating the second orifice element relative to the first orifice element such that the second orifice area of the second orifice element is disposed offset relative to the first orifice area of the first orifice element in the cross section of the duct.

The orifice according to the invention enables a desired flow cross section in the duct to be set in a variable manner. Consequently different volumetric flows through the duct as well as different pressures in the duct can be set, according to requirements, by means of the orifice according to the invention. The orifice according to the invention therefore enables the number of different orifice types which are required in an aircraft air conditioning system to be distinctly reduced. Furthermore, the orifice according to the invention enables the flow cross section in the duct to be easily varied, which is extremely advantageous when, for example during calibration to set the desired volumetric flow flowing through the duct or the desired pressure prevailing in the duct, it becomes apparent that a certain flow cross section is not suitable for obtaining the desired flow or pressure conditions in the duct or for obtaining a desired acoustic damping and must therefore be changed. As a result, the orifice according to the invention thus provides significant cost savings when used in an aircraft air conditioning system.

A first receiving device for fastening a first duct section to the first orifice element is preferably formed at the orifice frame of the first orifice element. The first orifice element can be connected to an open end of the first duct section by the first receiving device. For example, the first receiving device is in the form of a circular ring-shaped section of the orifice frame which surrounds an outer circumference of the first duct section, so that when the first duct section is connected to the first orifice element the edge of the first duct section lies against an outer edge of the first orifice area of the first orifice element.

In the region of the contact areas between the first orifice element and the first duct section the first orifice element can be glued to the first duct section, for example. As an alternative to this, however, other suitable joining or connecting methods can also be used to fasten the first orifice element to the first duct section. For example, it is conceivable to fasten the first orifice element to the first duct section by welding or by a suitable locking connection or similar.

As an alternative or in addition to this, a second receiving device for fastening a second duct section to the first orifice element can be formed at the orifice frame of the first orifice element. The second receiving device serves to connect the first orifice element to an open end of the second duct section. The second receiving device preferably comprises at least one circular ring segment-shaped section of the orifice frame of the first orifice element which embraces a part of an outer circumference of the second duct section when the first orifice element is connected to the second duct section. The second receiving device can in addition comprise a bearing surface which is formed by a step-shaped shoulder and extends in the radial direction substantially perpendicularly to the circular ring segment-shaped section of the orifice frame. Therefore an edge of the second duct section lies on the bearing surface of the second receiving device when the second duct section is connected to the first orifice element. In order to ensure that the first orifice element is connected particularly securely to the second duct section, a plurality of second receiving devices can also be distributed around the circumference of the orifice frame of the first orifice element.

In the region of the contact areas between the first orifice element and the second duct section the first orifice element can be glued to the second duct section, for example. As an alternative to this, however, other suitable joining or connecting is methods can also be used in order to fasten the first orifice element to the second duct section. For example, it is conceivable for the connection to take place through welding or the use of a locking connection or similar.

The adjustable orifice according to the invention can also comprise a third orifice element with a third orifice area. Similarly to the first orifice area of the first orifice element and the second orifice area of the second orifice element, the third orifice area of the third orifice element is intended to be introduced into the cross section of the duct and is shaped so that when the orifice is assembled at the duct it leaves open a part of the cross section of the duct. The third orifice element is preferably connected to the first and the second orifice element so as to be rotatable about an axis, so that the third orifice area of the third orifice element is rotatable relative to the first orifice area of the first orifice element and to the second orifice area of the second orifice element in order to set a desired flow cross section in the duct. An orifice which has three orifice elements which are rotatable relative to one another is distinguished by particularly high variability in setting the flow cross section in the duct and can therefore be used in a particularly flexible manner. Depending on the application-specific requirements to be met by the variability in setting the flow cross section in the duct, the adjustable orifice according to the invention can also be provided with further orifice elements which are rotatable relative to the other orifice elements.

The first orifice area of the first orifice element and/or the second orifice area of the second orifice element and/or the third orifice area of the third orifice element include at least one circular segment-shaped section. The circular segment-shaped sections of the orifice areas of the orifice elements can be brought into congruence with one another in a particularly simple manner by rotating the orifice elements relative to one another in order to leave open a maximum flow cross section in the duct. In a similar manner the circular segment-shaped sections of the orifice areas of the orifice elements can be easily positioned offset relative to one another by rotating the orifice elements relative to one another in order to narrow or even to completely close the flow cross section in the duct.

In one preferred embodiment of the orifice according to the invention the first orifice area of the first orifice element and/or the second orifice area of the second orifice element and/or the third orifice area of the third orifice element include a plurality of circular segment-shaped sections. A configuration of this kind of the orifice according to the invention enables sections of the duct cross section which are left open and closed to be uniformly distributed over the duct cross section. It is as a result possible to obtain a uniform flow through the duct cross section narrowed by the orifice in the region of the orifice.

A setting device for setting the position of the second orifice area of the second orifice element and/or the position of the third orifice area of the third orifice element relative to the first orifice area of the first orifice element is preferably formed at the second orifice element and/or the third orifice element. In other words, the setting device which is formed at the second orifice element and/or the third orifice element serves to rotate the second and/or the third orifice element in order to set a desired position of the orifice areas of the orifice elements relative to the first orifice element.

A setting device which is formed at the second orifice element preferably comprises an actuating lever which is connected to the second orifice area of the second orifice element and projects radially outwards from the second orifice area of the second orifice element. In a similar manner a setting device which is formed at the third orifice element preferably comprises an actuating lever which is connected to the third orifice area of the third orifice element and projects radially outwards from the third orifice area of the third orifice element.

When a second orifice element equipped with a setting device is connected to the first orifice element the actuating lever of the setting device extends in the region of a corresponding recess provided in the orifice frame of the first orifice element, so that the second orifice element can easily be rotated relative to the first orifice element from outside and without a tool by actuating the actuating lever when the orifice is assembled at the duct. The recess which is provided in the orifice frame of the first orifice element is in this respect preferably configured so that it simultaneously limits the rotation of the second orifice element relative to the first orifice element.

In a similar manner a third orifice element provided with a setting device can easily be rotated relative to the first and/or the second orifice element from outside and without a tool when connected to the first and/or the second orifice element by actuating the actuating lever of the setting device, which extends through a corresponding recess in the orifice frame of the first orifice element. It is again possible to limit the rotation of the third orifice element relative to the first and/or the second orifice element through an appropriate configuration of the recess in the orifice frame of the first orifice element.

In order to prevent an unwanted adjustment of the flow cross section in the duct during operation of the orifice according to the invention, the orifice according to the invention preferably comprises a retaining mechanism which serves to retain the second orifice element and/or the third orifice element in position relative to the first orifice element. The retaining mechanism can, for example, be a locking mechanism which interacts with the actuating lever of the setting device which is formed at the second and/or the third orifice element. The retaining mechanism can be configured so that it enables the orifice elements of the orifice according to the invention to be steplessly retained in different positions.

However, as an alternative to this, the retaining mechanism can also be formed so that it only allows the orifice elements of the orifice according to the invention to be fixed in different selected positions.

In one preferred embodiment of the orifice according to the invention which is of a particularly simple formation either just the second or just the third orifice element is formed with a setting device for setting the position of the second orifice area of the second orifice element or the third orifice area of the third orifice element relative to the first orifice area of the first orifice element. In order nevertheless also to enable the position of the orifice area of the orifice element which is not itself provided with a corresponding setting device to be adjusted, the orifice according to the invention preferably also comprises a driver device. The driver device can be formed at the orifice element which is provided with a setting device. However, as an alternative or in addition to this, the orifice element which does not itself comprise a setting device can be provided with a driver device. The driver device is shaped and positioned so that, when the orifice element which is equipped with a setting device rotates, it causes the orifice element which is not provided with a setting device to be driven and therefore likewise rotated relative to the first orifice element. The driver device can, for example, be in the form of a pin which extends substantially perpendicularly from the second orifice area of the second orifice element or from the third orifice area of the third orifice element.

A stop device is preferably also present in order to control the rotation of an orifice element which is not provided with a setting device relative to the other orifice elements. The stop device is shaped and positioned so that, when the orifice element which is not provided with a setting device rotates, it limits the rotation of this orifice element relative to the first orifice element. The stop device can be in the form of a pin, for example, which extends substantially perpendicularly from the second orifice area of the second orifice element or from the third orifice area of the third orifice element.

A scale can be applied to the orifice frame of the first orifice element to correlate the position of the orifice elements of the orifice according to the invention relative to one another with the flow cross section in the duct. The scale can be applied to the orifice frame of the first orifice element, for example, in the region of the recess formed in the orifice frame to receive the actuating lever of the setting device provided at the second and/or the third orifice element. The position of the actuating lever of the setting device which is formed at the second and/or the third orifice element can then be selected in a particularly easy and convenient manner on the basis of the scale so that a desired flow cross section is set in the duct.

An aircraft air conditioning system according to the invention comprises an adjustable orifice as described above.

BRIEF DESCRIPTION OF THE DRAWINGS

The present invention is illustrated in detail in the following with reference to the accompanying schematic figures, of which:

FIG. 6 shows an exploded longitudinal sectional view of the fourth embodiment of an orifice according to the invention according to FIG. 5, FIG. 7 shows a longitudinal sectional view of the fourth embodiment of an orifice according to the invention according to FIG. 5 in the assembled state, and FIGS. 8a to c show front views of the fourth embodiment of an orifice according to the invention according to FIG. 5 in different positions.

DETAILED DESCRIPTION

Figure 1:
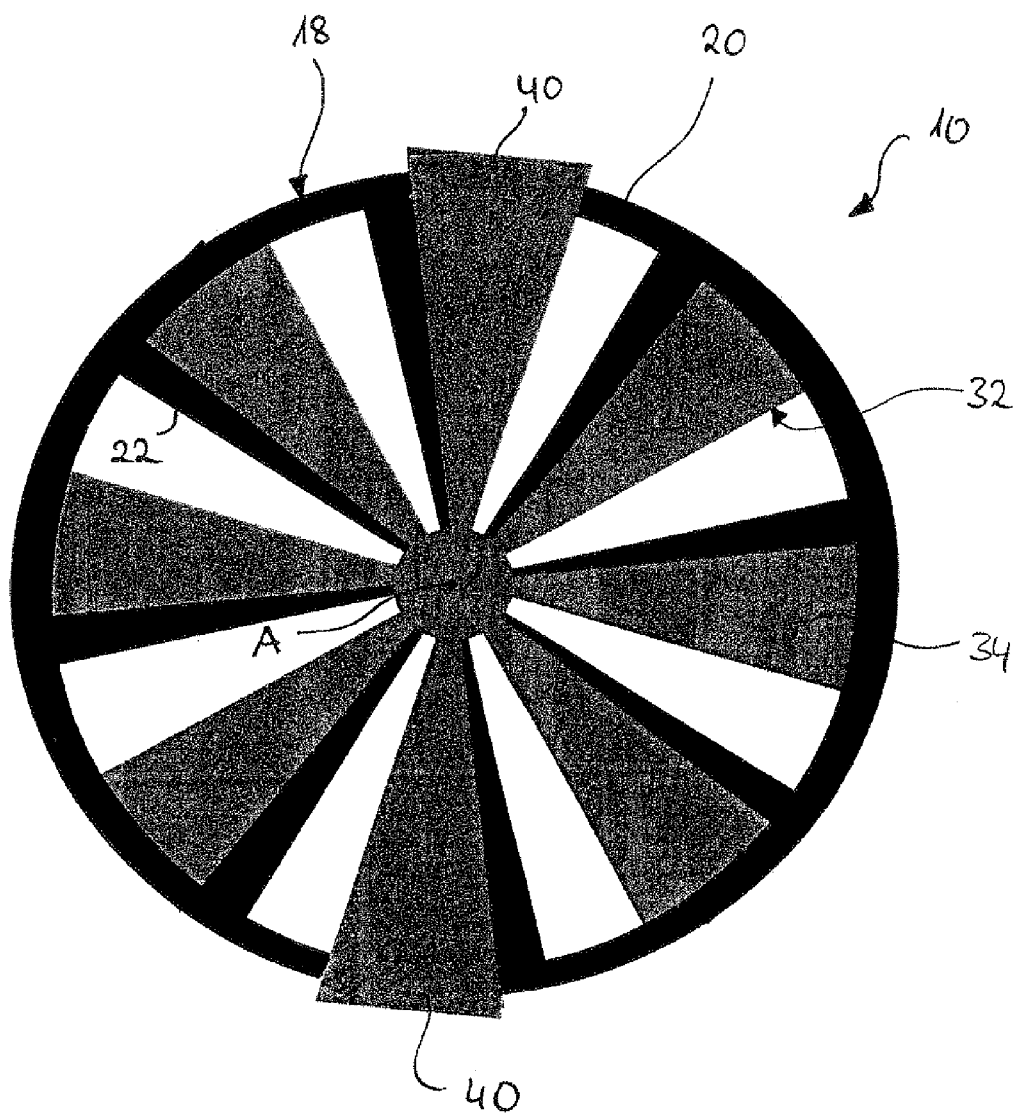
FIG. 1 shows a front view of a first embodiment of an orifice according to the invention with two orifice elements.
Figure 2:
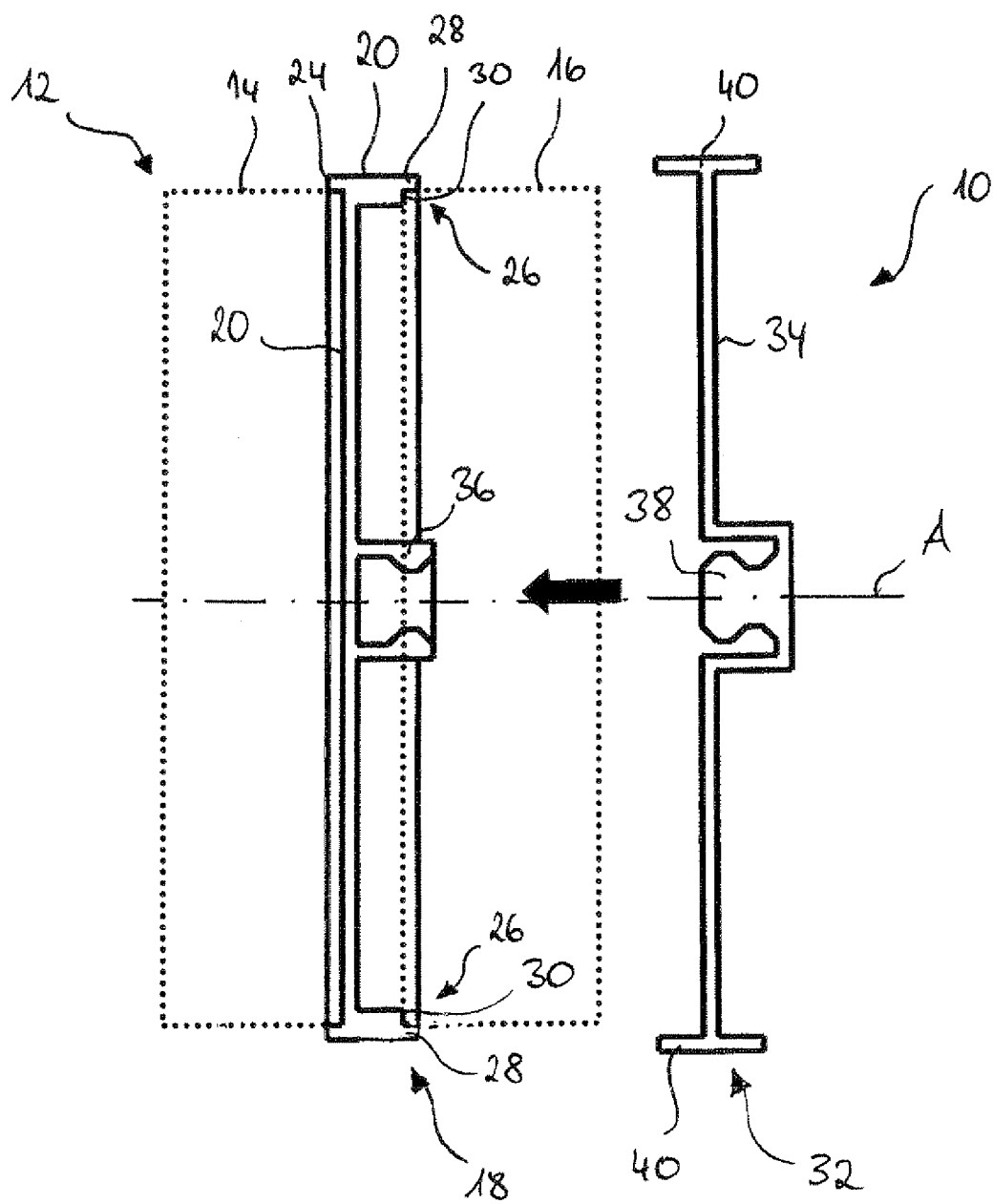
FIG. 2 shows an exploded longitudinal sectional view of the first embodiment of an orifice according to the invention according to FIG. 1, FIGS. 3a to c show a second embodiment of an orifice according to the invention with two orifice elements in different positions.
Figure 2:
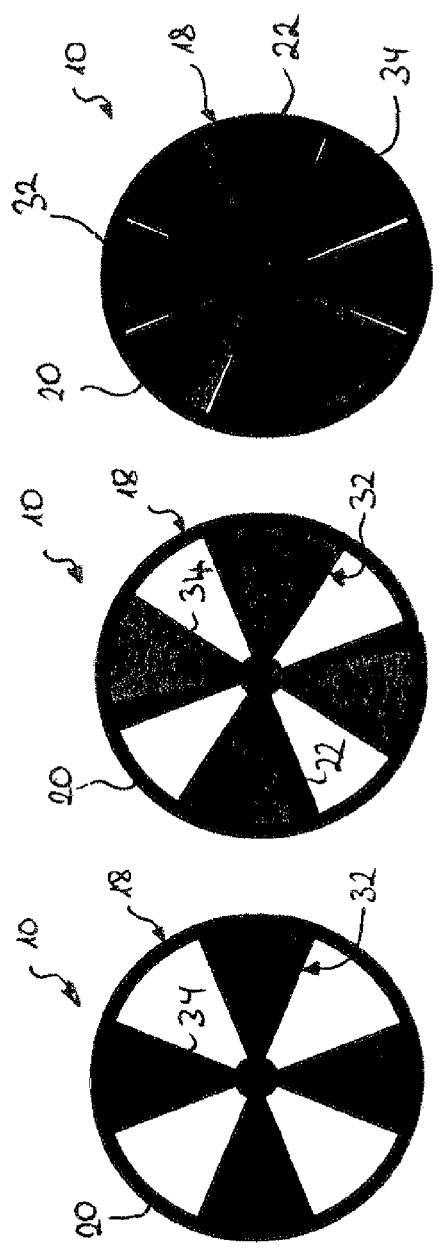

FIGS. 1 and 2 show an orifice 10 which is intended to serve in an aircraft air conditioning system to set a flow cross section in a duct 12 of the aircraft air conditioning system. The duct 12 can be a recirculation duct, a fresh air duct, an exhaust air duct or any other desired duct of the aircraft air conditioning system. As can be seen in FIG. 2, the duct 12 comprises a first duct section 14 as well as a second duct section 16. The duct sections 14, 16 each have open ends which are intended to be connected to the orifice 10.

The orifice 10 comprises a first orifice element 18 which comprises an orifice frame 20 as well as a first orifice area 22. The orifice frame 20 of the first orifice element 18 serves to fasten the first orifice element 18 to the duct sections 14, 16 of the duct 12. For this purpose a first receiving device 24 formed by a circular ring-shaped section of the orifice frame 20 is provided at the orifice frame 20 of the first orifice element 18. As shown in FIG. 2, the first receiving device 24 embraces an outer circumference of the first duct section 14 when the first orifice element 18 is assembled at the first duct section 14. An edge of the first duct section 14 lies against an outer section of the first orifice area 22. In the region of these contact areas between the first duct section 14 and the first orifice element 18 the first duct section 14 and the first orifice element 18 can be glued together or joined in another way.

Two second receiving devices 26 are also formed at the orifice frame 20 of the first orifice element 18 to receive the second duct section 16. The second receiving devices 26 each comprise a circular ring segment-shaped section 28 of the orifice frame 20 which extends over a part of an outer circumference of the orifice frame 20 and embraces a part of the circumference of the second duct section 16 when the first orifice element 18 is connected to the second duct section 16. A respective bearing surface 30, which is formed by a step-shaped shoulder provided at the orifice frame 20, extends perpendicularly to the circular ring segment-shaped sections 28 of the second receiving devices 26. A part of the edge of the second duct section 16 lies on the bearing surfaces 30 of the second receiving devices 26 when the first orifice element 18 is connected to the second duct section 16. In the region of the contact areas of the first orifice element 18 and the second duct section 16 the second duct section 16 and the first orifice element 18 can be glued together or joined in another way, similarly to the first duct section 14 and the first orifice element 18.

The first orifice area 22 of the first orifice element 18, which is disposed in the cross section of the duct 12 when the orifice 10 is connected to the duct 12, has eight circular segment-shaped sections disposed in a uniformly distributed manner. In the region of the circular segment-shaped sections the first orifice area 22 of the first orifice element 18 closes the cross section of the duct 12 when the orifice 10 is connected to the duct 12. Between the circular segment-shaped sections of the first orifice area 22 the first orifice area 22 of the first orifice element 18 leaves open the cross section of the duct 12 for through-flow when the orifice 10 is connected to the duct 12.

The orifice 10 also comprises a second orifice element 32 which, similarly to the first orifice element 18, comprises a second orifice area 34 comprising eight circular segment-shaped sections. When the orifice 10 is assembled at the duct 12, the second orifice area 34 of the second orifice element 32 closes the cross section of the duct 12 in the region of the circular segment-shaped sections. On the other hand, between the circular segment-shaped sections of the second orifice area 34 the second orifice element 32 leaves open the cross section of the duct for through-flow when the orifice 10 is assembled at the duct 12.

The second orifice element 32 is rotatably connected to the first orifice element 18. The rotatable connection between the first orifice element 18 and the second orifice element 32 is established through the interaction of a receiving sleeve 36 formed at the first orifice element 18 with a pin 38 formed at the second orifice element 32. As the first orifice element 18 and the second orifice element 32 are made as injection-molded components of an elastic plastics material, the receiving sleeve 36 and the pin 38 can be interlocked such that a secure connection between the first orifice element 18 and the second orifice element 32 is guaranteed, although the second orifice element 32 is still rotatable relative to the first orifice element 18 about an axis A. However the first orifice element 18 and the second orifice element 32 can alternatively also consist of another suitable material and be brought into their final shape by a suitable shaping method.

A setting device 40 in the form of an actuating lever is formed at the second orifice element 32. The setting device 40 extends outwards in the radial direction from the second orifice area 34 of the second orifice element 32 through the recesses formed in the orifice frame 20 between the circular ring segment-shaped sections 28 of the second receiving devices 26. The setting device 40 can thereby be actuated in a convenient manner from outside and without a tool when the orifice 10 is assembled at the duct 12 in order to rotate the second orifice element 32 relative to the first orifice element 18. The rotation of the second orifice element 32 relative to the first orifice element 18 is in this respect limited through the interaction of the setting device 40 formed at the second orifice element 32 with the circular ring segment-shaped sections 28 of the second receiving devices 26 formed at the orifice frame 20 of the first orifice element 18.

The first orifice area 22 of the first orifice element 18 and the second orifice area 34 of the second orifice element 32 are configured so that they can be brought into congruence with one another. When the orifice 10 is set in this way the orifice 10 opens up eight circular segment-shaped sections of the cross section of the duct 12 for through-flow. These circular segment-shaped sections of the duct cross section which are left open for through-flow can be steplessly reduced by rotating the second orifice area 34 of the second orifice element 32 relative to the first orifice area 22 of the first orifice element 18 until the cross section of the duct 12 is completely closed by the orifice areas 22, 34, which are offset relative to one another to a maximum, of the orifice elements 18, 32.

In order to prevent unwanted rotation of the second orifice element 32 relative to the first orifice element 18 and therefore unwanted adjustment of the flow cross section in the duct 12, the orifice 10 has a retaining mechanism, which is not shown in the drawings. The retaining mechanism is in the form of a locking mechanism which interacts with the setting device 40, which is in the form of an actuating lever, of the second orifice element 32 in order to steplessly retain the second orifice element 32 in a desired position relative to the first orifice element 18.

A scale, which is not shown in the figures, is in addition applied to an outer circumference of the orifice frame 20 of the first orifice element 18 in the region of the recesses formed in the orifice frame 20 and defined by the circular ring segment-shaped sections 28 of the second receiving devices 26. The scale correlates the position of the setting device 40, in the form of an actuating lever, of the second orifice element 32 and therefore the position of the orifice elements 18, 32 relative to one another with the flow cross section in the duct 12.

A second embodiment of an orifice 10 comprising a first and a second orifice element 18, 32 is represented in different positions in FIGS. 3a to c. The orifice 10 which is shown in FIGS. 3a to c only differs from the arrangements which are represented in FIGS. 1 and 2 in that the first orifice area 22 of the first orifice element 18, just like the second orifice area 34 of the second orifice element 32, has just four circular segment-shaped sections instead of eight circular segment-shaped sections. As can be seen in FIG. 3a, the circular segment-shaped sections of the orifice areas 22, 34 of the orifice elements 18, 32 can be brought completely into congruence with one another in order to enable the flow cross section of the duct 12 to be left open to a maximum (approximately 50%). By rotating the second orifice area 34 of the second orifice element 32 relative to the first orifice area 22 of the first orifice element 18, the cross section of the duct 12 through which a flow can freely take place can be steplessly reduced (see FIG. 3b) until, with the position of the orifice areas 22, 34 of the orifice elements 18, 32 being offset to a maximum, the cross section of the duct 12 is completely closed (see FIG. 3c). In other respects the structure and the mode of operation of the orifice 10 which is shown in FIGS. 3a to c correspond to the structure and the mode of operation of the arrangement according to FIGS. 1 and 2.

Figure 4:
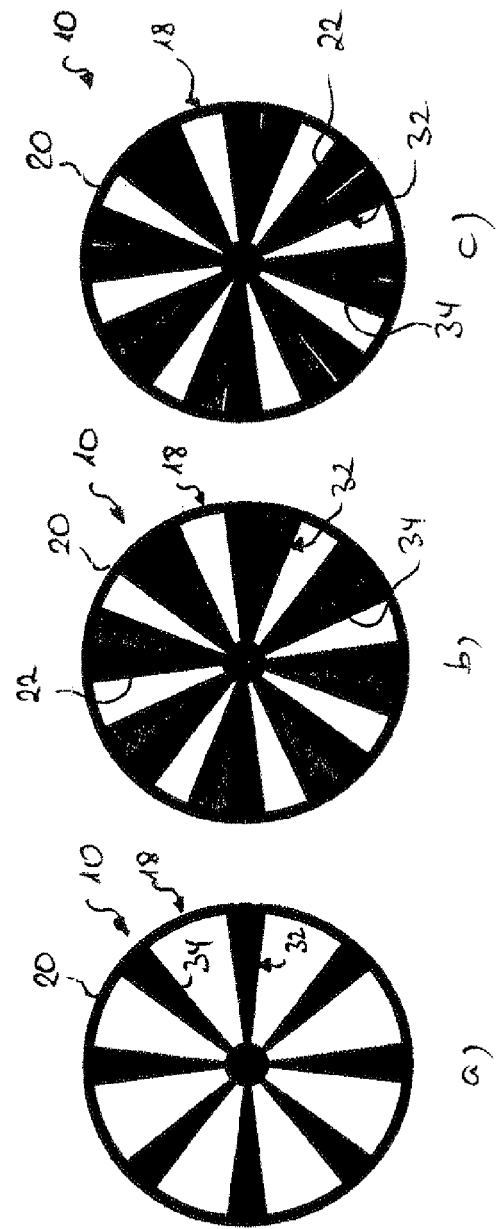
FIGS. 4a to c show a third embodiment of an orifice according to the invention with two orifice elements in different positions.
Figure 5:
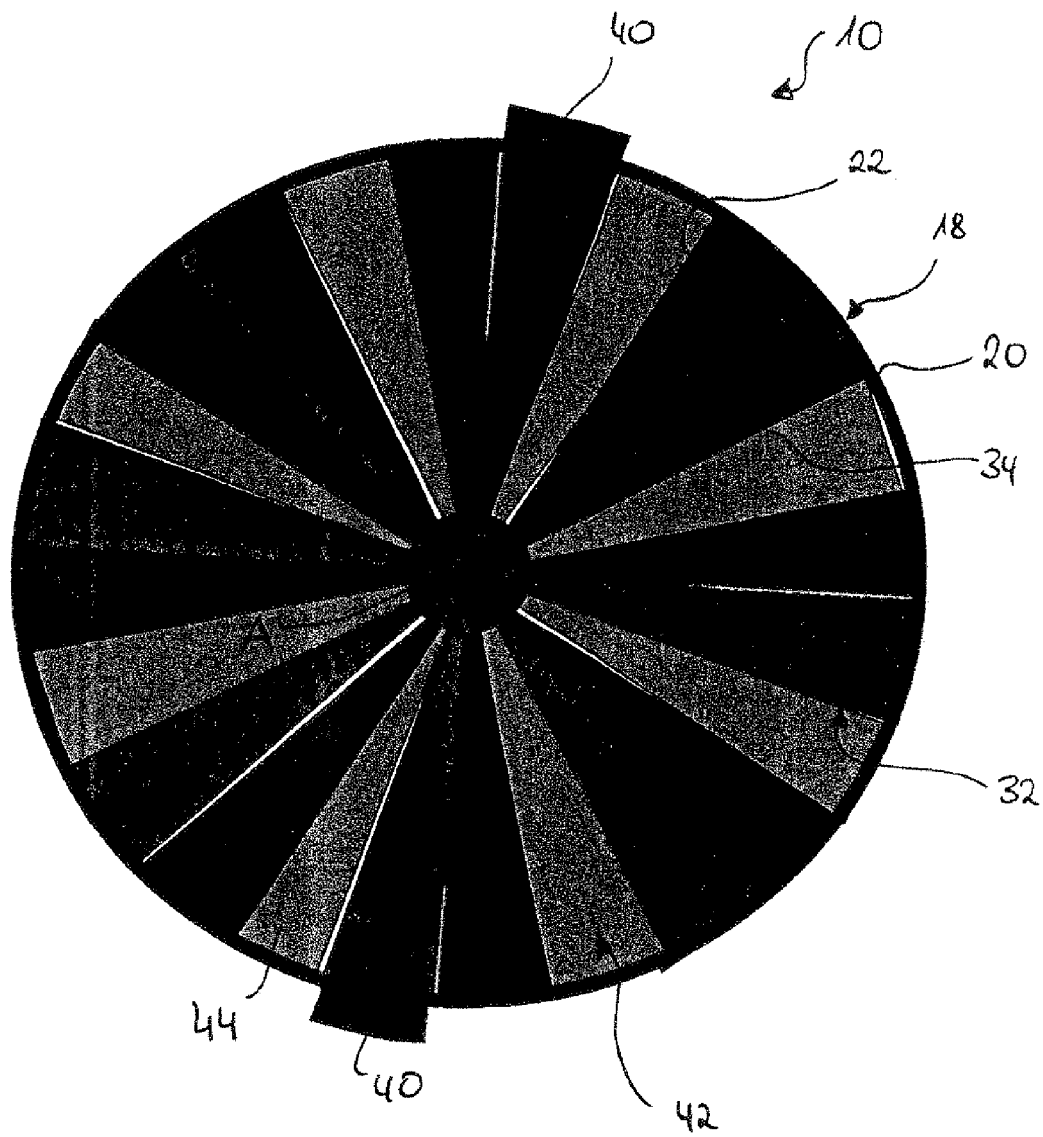
FIG. 5 shows a front view of a fourth embodiment of an orifice according to the invention with three orifice elements.

FIGS. 4a to c show a third embodiment of an orifice 10 having two orifice elements 18, 32. However, in contrast to the arrangements which are shown in FIGS. 1, 2 and 3a to c, the first orifice area 22 of the first orifice element 18 and the second orifice area 34 of the second orifice element 32 of the orifice 10 which is represented in FIGS. 4a to c are shaped so that they do not enable the cross section of the duct 12 to be completely closed. Instead the orifice 10 leaves open approximately 66% of the duct cross section when in its maximum open position (see FIG. 4a) and closes is the duct cross section when in its maximum closed position (see FIG. 4c) to an extent such that only just 33% of the duct cross section still remains as an area through which a flow can freely take place. In other respects the structure and the mode of operation of the orifice according to FIGS. 4a to 4c correspond to the structure and the mode of operation of the arrangements which are shown in FIGS. 1, 2 and 3a to c.

Finally, FIGS. 5, 6, 7 and 8a to c show a fourth embodiment of an orifice 10 which differs from the arrangement according to FIGS. 4a to c in that it comprises a third orifice element 42. The third orifice element 42 comprises a third orifice area 44 which, just like the first orifice area 22 of the first orifice element 18 and the second orifice area 34 of the second orifice element 32, comprises eight circular segment-shaped sections. In the region of a centre point of the third orifice element 42 an opening 46 is formed in the third orifice area 44 which enables the third orifice element 42 to be pushed over the receiving sleeve 36 which is formed at the first orifice element 18. The third orifice element 42 is fixed to the first orifice element 18 by the second orifice element 32. In other words, when the orifice 10 is in the assembled state (see FIG. 7) the third orifice element 42 is received between the first orifice element 18 and the second orifice element 32, with the third orifice element 42, just like the second orifice element 32, being rotatable relative to the first orifice element 18 about the axis A. Consequently the third orifice area 44 of the third orifice element 42, just like the second orifice area 34 of the second orifice element 32, can be rotated relative to the first orifice area 22 of the first orifice element 18 in order to set a desired flow cross section in the duct 12.

Unlike the second orifice element 32, the third orifice element 42 is not provided with a setting device 40. Instead the third orifice element 42 comprises a driver device 48 which is in the form of a pin and extends substantially perpendicularly from the third orifice area 44 of the third orifice element 42. When the setting device 40 formed at the second orifice element 32 is actuated, an edge of a circular segment-shaped section of the second orifice area 34 of the second orifice element 32 interacts with the driver device 48 formed at the third orifice element 42, so that the third orifice element 42 is rotated together with the second orifice element 32 relative to the first orifice element 18.

A stop device 50 is also formed at the third orifice element 42 in order to limit the rotation of the third orifice element 42 relative to the first orifice element 18. The pin-shaped stop device 50 extends substantially perpendicularly from the third orifice area 44 of the third orifice element 42 and, when the third orifice element 42 rotates relative to the first orifice element 18, interacts with an edge of a circular segment-shaped section of the first orifice area 22 of the first orifice element 18 once the third orifice element 42 has reached a desired end position relative to the first orifice element 18.

As can be seen in FIGS. 8*a* to *c*, a particularly flexible setting of the flow cross section in the duct 12 is possible with an orifice 10 comprising three orifice elements 18, 32, 42. In its maximum open position, in which the orifice areas 22, 34, 44 of the orifice elements 18, 32, 42 are completely congruent, the orifice 10 leaves open 66% of the duct cross section for through-flow (see FIG. 8*a*). By appropriately rotating the second orifice area 34 of the second orifice element 32 and the third orifice area 44 of the third orifice element 42 relative to the first orifice area 22 of the first orifice element 18, the cross section of the duct 12 through which a flow can take place can be steplessly reduced until it is completely closed (see FIG. 8*c*). In other respects the structure and the mode of operation of the orifice 10 which is shown in FIGS. 5, 6, 7 and 8*a* to *c* correspond to the structure and the mode of operation of the arrangement according to FIGS. 4*a* to *c*.

The invention claimed is:

1. An adjustable orifice for use in an air conditioning system, such as an aircraft air conditioning system, the adjustable orifice comprising:
    a first orifice element which has an orifice frame as well as a first orifice area, wherein when the orifice is assembled at a duct of the air conditioning system, the first orifice area of the first orifice element leaves open a part of a cross section of the duct,
    a second orifice element which has a second orifice area, wherein when the adjustable orifice is assembled at the duct, the second orifice area of the second orifice element leaves open a part of the cross section of the duct, and wherein the second orifice element is connected to the first orifice element so as to be rotatable about an axis, such that the second orifice area of the second orifice element is rotatable relative to the first orifice area of the first orifice element in order to set a desired flow cross section in the duct,
    a third orifice element which has a third orifice area, wherein when the adjustable orifice is assembled at the duct, the third orifice area of the third orifice element leaves open a part of the cross section of the duct, and wherein the third orifice element is connected to the first and the second orifice elements so as to be rotatable about an axis, such that the third orifice area of the third orifice element is rotatable relative to the first orifice area of the first orifice element and relative to the second orifice area of the second orifice element in order to set a desired flow cross section in the duct, and
    a driver device which is formed along at least one of the second orifice element and the third orifice element, wherein the driver device is shaped and positioned so that when the third orifice area of the third orifice element rotates relative to the first orifice area of the first orifice element, the second orifice area of the second orifice element is driven and therefore likewise rotated relative to the first orifice area of the first orifice element, or positioned so that when the second orifice area of the second orifice element rotates relative to the first orifice area of the first orifice element, the third orifice area of the third orifice element is driven and therefore likewise rotated relative to the first orifice area of the first orifice element.

2. An adjustable orifice according to claim 1, further comprising at least one of:
    a first receiving device for fastening a first duct section to the first orifice element and formed at the orifice frame of the first orifice element, and
    a second receiving device for fastening a second duct section to the first orifice element and formed at the orifice frame of the first orifice element.

3. An adjustable orifice according to claim 1, wherein the shape of the orifice frame is adapted to the cross-sectional shape of the duct.

4. An adjustable orifice according to claim 1, wherein at least one of the first orifice area of the first orifice element, the second orifice area of the second orifice element, and the third orifice area of the third orifice element includes at least one circular segment-shaped section.

5. An adjustable orifice according to claim 1, wherein at least one of the first orifice area of the first orifice element, the second orifice area of the second orifice element, and the third orifice area of the third orifice element includes a plurality of circular segment-shaped sections.

6. An adjustable orifice according to claim 1, further comprising:
    a setting device for setting the position of at least one of the second orifice area of the second orifice element and the position of the third orifice area of the third orifice element relative to the first orifice area of the first orifice element, and the setting device is formed on at least one of the second orifice element and the third orifice element.

7. An adjustable orifice according to claim 6, wherein the setting device comprises an actuating lever which extends radially outwards in the region of a recess provided in the orifice frame of the first orifice element, so that the position of at least one of the second orifice area of the second orifice element and the position of the third orifice area of the third orifice element relative to the first orifice area of the first orifice element can be set from an area outside the duct and without a tool by actuating the actuating lever when the adjustable orifice is assembled at the duct.

8. An adjustable orifice according to claim 1, further comprising:

a retaining mechanism for retaining at least one of the second orifice element and the third orifice element in position relative to the first orifice element.

9. An adjustable orifice according to claim 1, further comprising:
a stop device which is formed along at least one of the second orifice element and the third orifice element, and the stop device is shaped and positioned so that the stop device limits a rotation of the second orifice area of the second orifice element relative to the first orifice area of the first orifice element, or shaped and positioned so that the stop device limits a rotation of the third orifice area of the third orifice element relative to the first orifice area of the first orifice element.

10. An adjustable orifice according to claim 1, further comprising:
a scale applied to the orifice frame of the first orifice element to correlate the position of the orifice elements relative to one another with the flow cross section in the duct.

11. An aircraft air conditioning system comprising the adjustable orifice according to claim 1.

12. An aircraft air conditioning system according to claim 11, wherein the adjustable orifice further comprises at least one of:
a first receiving device for fastening a first duct section to the first orifice element and formed at the orifice frame of the first orifice element, and
a second receiving device for fastening a second duct section to the first orifice element and formed at the orifice frame of the first orifice element.

13. An aircraft air conditioning system according to claim 11, wherein the shape of the orifice frame is adapted to the cross-sectional shape of the duct.

14. An aircraft air conditioning system according to claim 11, wherein at least one of the first orifice area of the first orifice element, the second orifice area of the second orifice element, and the third orifice area of the third orifice element includes at least one circular segment-shaped section.

15. An aircraft air conditioning system according to claim 11, wherein at least one of the first orifice area of the first orifice element, the second orifice area of the second orifice element, and the third orifice area of the third orifice element includes a plurality of circular segment-shaped sections.

16. An aircraft air conditioning system according to claim 11, wherein the adjustable orifice further comprises:
a setting device for setting the position of at least one of the second orifice area of the second orifice element and the position of the third orifice area of the third orifice element relative to the first orifice area of the first orifice element, and the setting device is formed on at least one of the second orifice element and the third orifice element.

17. An aircraft air conditioning system according to claim 16, wherein the setting device comprises an actuating lever which extends radially outwards in the region of a recess provided in the orifice frame of the first orifice element, so that the position of at least one of the second orifice area of the second orifice element and the position of the third orifice area of the third orifice element relative to the first orifice area of the first orifice element can be set from an area outside the duct and without a tool by actuating the actuating lever when the adjustable orifice is assembled at the duct.

18. An aircraft air conditioning system according to claim 11, wherein the adjustable orifice further comprises:
a retaining mechanism for retaining at least one of the second orifice element and the third orifice element in position relative to the first orifice element.

19. An aircraft air conditioning system according to claim 11, wherein the adjustable orifice further comprises:
a stop device which is formed along at least one of the second orifice element and the third orifice element, and the stop device is shaped and positioned so that the stop device limits a rotation of the second orifice area of the second orifice element relative to the first orifice area of the first orifice element, or shaped and positioned so that the stop device limits a rotation of the third orifice area of the third orifice element relative to the first orifice area of the first orifice element.

20. An aircraft air conditioning system according to claim 11, wherein the adjustable orifice further comprises:
a scale applied to the orifice frame of the first orifice element to correlate the position of the orifice elements relative to one another with the flow cross section in the duct.

* * * * *